(12) United States Patent
Sattler et al.

(10) Patent No.: US 11,015,679 B2
(45) Date of Patent: May 25, 2021

(54) V-BELT AND METHOD FOR THE PRODUCTION THEREOF

(71) Applicant: ContiTech Antriebssysteme GmbH, Hannover (DE)

(72) Inventors: Heiko Sattler, Wedemark (DE); Dirk Bartsch-Kuszewski, Hemmingen (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 388 days.

(21) Appl. No.: 16/306,562

(22) PCT Filed: Mar. 9, 2017

(86) PCT No.: PCT/EP2017/055558
§ 371 (c)(1),
(2) Date: Dec. 1, 2018

(87) PCT Pub. No.: WO2017/207123
PCT Pub. Date: Dec. 7, 2017

(65) Prior Publication Data
US 2019/0219133 A1    Jul. 18, 2019

(30) Foreign Application Priority Data
Jun. 2, 2016   (DE) .................... 10 2016 209 633.8

(51) Int. Cl.
*F16G 5/08*   (2006.01)
*F16G 5/20*   (2006.01)
(Continued)

(52) U.S. Cl.
CPC ............... *F16G 5/08* (2013.01); *B29D 29/10* (2013.01); *B32B 3/30* (2013.01); *B32B 5/024* (2013.01);
(Continued)

(58) Field of Classification Search
CPC ..... F16G 5/20; F16G 5/06; F16G 5/08; B29D 29/10
(Continued)

(56) References Cited

U.S. PATENT DOCUMENTS 1,729,329 A * 9/1929 Chilton .................... F16G 5/06
156/140
1,970,509 A * 8/1934 De Wein ................... F16G 5/06
474/262
(Continued)

FOREIGN PATENT DOCUMENTS

| JP | H01127263 A | 5/1989 |
| JP | 2007040314 A | 2/2007 |
| JP | 2009236311 A | 10/2009 |

*Primary Examiner* — Henry Y Liu
(74) *Attorney, Agent, or Firm* — David L. Cate; Gregory Adams

(57) ABSTRACT

V-belt from an elastomeric material, composed of an in each case annular V-belt substructure and V-belt back that are connected to one another and are produced as a V-belt composite from two individually tailored and conjointly vulcanized part-blanks, specifically a first part-blank that is configured as a V-belt substructure and includes the belt profile, and a second part-blank that is configured as a wound V-belt back, wherein the V-belt has one or a plurality of tiers of reinforcing support cords and on the belt back and/or on the profile side of said V-belt has a woven fabric, wherein the reinforcing support cords are radially disposed so as to be in a circumferential plane in the V-belt back and so as to be outside the V-belt substructure.

6 Claims, 3 Drawing Sheets

Figure 1:
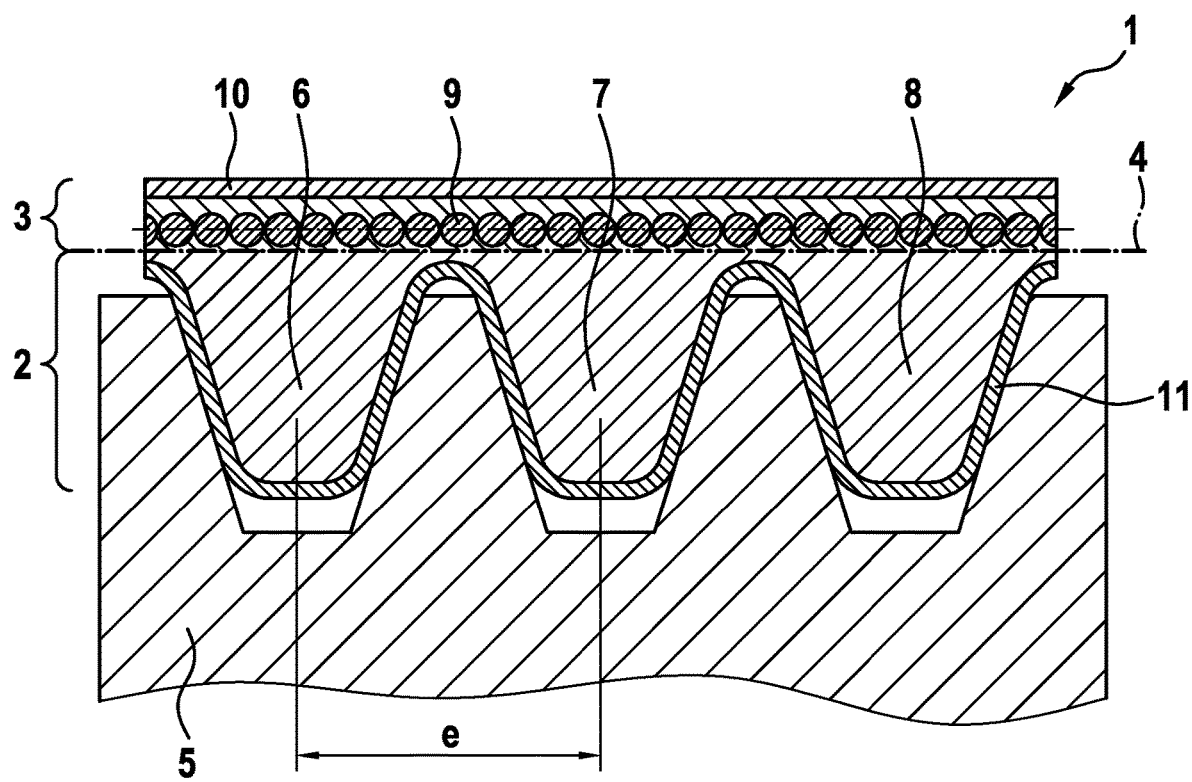

(51) Int. Cl.
    *F16G 5/22*     (2006.01)
    *B29D 29/10*     (2006.01)
    *B32B 3/30*     (2006.01)
    *B32B 5/02*     (2006.01)
    *B32B 25/10*     (2006.01)

(52) U.S. Cl.
    CPC ............... *B32B 25/10* (2013.01); *F16G 5/20* (2013.01); *F16G 5/22* (2013.01); *B32B 2433/04* (2013.01)

(58) Field of Classification Search
    USPC .......................................................... 474/238
    See application file for complete search history.

(56) References Cited

U.S. PATENT DOCUMENTS

| | | | | |
|---|---|---|---|---|
| 2,113,561 | A * | 4/1938 | Freedlander | F16G 5/20 474/262 |
| 2,211,202 | A * | 8/1940 | Freedlander | F16G 5/20 474/250 |
| 2,519,590 | A * | 8/1950 | Mitchell | F16G 1/08 474/267 |
| 2,582,366 | A * | 1/1952 | White | F16G 5/06 474/261 |
| 2,598,158 | A * | 5/1952 | Fihe | B29D 29/10 425/34.2 |
| 2,684,315 | A * | 7/1954 | Spicer | F16G 5/06 474/264 |
| 2,726,976 | A * | 12/1955 | Waugh | F16G 5/06 474/265 |
| 2,822,856 | A * | 2/1958 | Waugh | B29C 70/08 156/139 |
| 3,469,512 | A * | 9/1969 | Garbin | B29D 29/10 474/263 |
| 3,566,706 | A * | 3/1971 | Fix | F16G 5/166 474/265 |
| 3,592,709 | A * | 7/1971 | Marzocchi et al. | B29D 29/10 156/142 |
| 3,724,284 | A * | 4/1973 | Eng | F16G 5/04 474/265 |
| 4,255,147 | A * | 3/1981 | Miranti, Jr. | F16G 5/08 156/141 |
| 4,305,714 | A * | 12/1981 | Renshaw | B29D 29/106 474/250 |
| 4,355,994 | A * | 10/1982 | Brew | B29D 29/10 474/266 |
| 4,464,153 | A * | 8/1984 | Brew | F16G 5/06 474/266 |
| 4,475,968 | A * | 10/1984 | Brew | F16G 5/06 156/137 |
| 4,522,614 | A * | 6/1985 | Matsuoka | F16G 5/06 264/229 |
| 7,056,249 | B1 * | 6/2006 | Osako | F16G 1/06 474/260 |
| 9,273,756 | B2 * | 3/2016 | Mitsutomi | B29D 29/103 |
| 9,709,128 | B2 * | 7/2017 | Fleck | F16G 5/08 |
| 10,000,029 | B2 * | 6/2018 | Miyata | B29C 66/1122 |
| 2003/0027920 | A1 * | 2/2003 | Kinoshita | F16G 5/06 524/508 |
| 2003/0078125 | A1 * | 4/2003 | Knutson | F16G 1/10 474/260 |
| 2006/0293140 | A1 * | 12/2006 | Daugherty | F16G 5/06 474/261 |
| 2008/0286529 | A1 * | 11/2008 | Sueto | F16G 5/20 428/167 |
| 2010/0173740 | A1 * | 7/2010 | Mori | D03D 1/0094 474/252 |
| 2011/0003659 | A1 * | 1/2011 | Wu | D03D 15/49 474/250 |
| 2011/0028257 | A1 * | 2/2011 | Sealey | F16G 5/04 474/263 |
| 2011/0129647 | A1 * | 6/2011 | Duke, Jr. | C08J 5/046 428/156 |
| 2011/0269589 | A1 * | 11/2011 | Schleicher | F16G 5/20 474/205 |
| 2012/0115658 | A1 * | 5/2012 | Kanzow | F16G 5/20 474/238 |
| 2014/0296010 | A1 * | 10/2014 | Yoshida | B29D 29/00 474/190 |
| 2014/0323256 | A1 * | 10/2014 | Yoshida | B29D 29/10 474/148 |
| 2015/0087456 | A1 * | 3/2015 | Baltes | F16G 5/08 474/266 |
| 2015/0259176 | A1 * | 9/2015 | Goeser | B32B 3/18 428/189 |
| 2016/0298726 | A1 * | 10/2016 | Hazim | F16G 5/06 |
| 2016/0347013 | A1 * | 12/2016 | Miyata | B29C 66/4324 |
| 2017/0029578 | A1 * | 2/2017 | Wu | C08G 18/10 |
| 2017/0284504 | A1 * | 10/2017 | Mitsutomi | B29D 29/08 |
| 2017/0314641 | A1 * | 11/2017 | Kamba | C08L 29/04 |
| 2018/0036975 | A1 * | 2/2018 | Yoshida | F16G 1/28 |
| 2018/0080527 | A1 * | 3/2018 | Imaoka | B29C 66/73752 |
| 2018/0223953 | A1 * | 8/2018 | Harada | B29D 29/10 |

* cited by examiner

V-BELT AND METHOD FOR THE PRODUCTION THEREOF

The invention relates to a V-belt from an elastomeric material, composed of two in each case annular interconnected parts, specifically a V-belt substructure and a V-belt back, wherein the V-belt has one or a plurality of tiers of reinforcing support cords and on the belt back of said V-belt and/or on the profile side of said V-belt has a woven fabric. The invention furthermore relates to a method for producing such V-belts, wherein a V-belt composite of a plurality of V-belts that lie beside one another is produced from a composite-body blank. The composite-body blank herein is produced from two individually tailored and conjointly vulcanized part-blanks, specifically a first part-blank that is configured as a wound V-belt substructure and includes the belt profile, and a second non-profiled part-blank that is configured as a wound V-belt back.

Individual V-belts or composite V-belts having narrow V-belt profiles (SPA, SPB, SPC) that are sheathed by a woven fabric and have classic V-belt profiles A-E according to DIN 7753 or DIN 2215, respectively, are used predominantly for high-performance V-belt drives in the agricultural sector. The reasons therefor are the resistance of said V-belts to environmental influences and the capability of said V-belts to also be operated occasionally under overload without damage. Individual V-belts that are sheathed by a woven fabric, as well as the individual part-belts in composite V-belts, are composed of a core including a mixture and cords and the woven sheathing fabric.

The production of such V-belts is usually performed such that rubber tiers and reinforcing supports (cords) are wound onto a construction so as to form a type of thick tubular wound body, from which individual rings that are rectangular in the cross section are cut off thereafter. These so-called core blanks are individually and completely sheathed by a woven fabric, compressed into a wedge shape, and then vulcanized. Almost all usual narrow V-belt profiles (SPA, SPB, SPC) and all classic V-belt profiles A-E according to DIN 7753 or DIN 2215, respectively, are produced by such production methods.

In the production of composite V-belts, thus drive belts in which a plurality of individual V-belts that lie beside one another are interconnected, individual core blanks are likewise first produced, said individual core blanks then being interconnected by a cover tier from a rubber mixture and a woven cover fabric.

However, sheathing of the individual core blanks by a woven fabric is difficult since the handling of the relatively narrow core blanks is rather complicated and applying the woven fabric requires a particularly good adhesion of the as yet non-vulcanized core blank to the woven sheathing fabric. Such a sufficiently good adhesion is typically not provided in particular in the case of rubber mixtures from ethylene propylene diene monomer rubber (EPDM) or else from hydrogenated acrylonitrile butadiene rubber (HNBR) by virtue of the polymer structure of said materials. This leads to such individual V-belts or else composite V-belts currently being offered only from materials of which the mixtures are sufficiently tacky, or have a good adhesion, respectively. Said materials are most typically materials based on natural rubber (NR), butadiene rubber (BR), styrene butadiene rubber (SBR), and chloroprene rubber (CR). However, in the case of said materials it is disadvantageous that the temperature resistance thereof is guaranteed only up to approx. 80° C. The aging and embrittlement of said rubber mixtures can set in at a relatively early stage in the case of permanently high temperatures. An occasional operation under overload or a use in tough environments in this instance is possible only to a very limited extent.

The invention is therefore based on the object of providing a V-belt that is sheathed by a woven fabric for high-performance belt drives which is capable of being used under constant load also at high temperatures above 80° C. and which reacts so as to be tolerant of load peaks or brief overloads and which is simple to produce and which for adapting to/increasing the transmission output is readily capable of being completed so as to form a composite V-belt.

This object is achieved by the features of the main claim. Further advantageous configurations are disclosed in the dependent claims. A particularly suitable production method and an advantageous use for such V-belts are likewise disclosed.

The V-belt according to the invention herein is composed of an elastomeric material from two in each case interconnected annular parts, specifically a V-belt substructure and V-belt back, and is produced as a V-belt composite from two individually tailored and conjointly vulcanized part-blanks, specifically a first part-blank that is configured as a wound V-belt substructure and includes the belt profile, and a second non-profiled part-blank that is configured as a wound V-belt back. The V-belt has one or a plurality of tiers of reinforcing support cords, and on the belt back and/or on the profile side of said V-belt has a woven fabric. The reinforcing support cords that run in the longitudinal direction of the V-belt are radially disposed so as to be substantially in a circumferential plane in the belt back, and in particular so as to be outside the V-belt substructure that after vulcanizing has been created from the first part-blank and is provided for engaging in a belt pulley.

The feature of the V-belt according to the invention being produced from two part-blanks herein is indeed a substantive feature and appears to be a feature of the method only superficially and at a first glance. This division of the V-belt into two parts already in the nascent state specifically ensures that the deformation steps required for establishing the required profile have to be carried out only on one of the part-blanks, and the reinforcing supports therefore cannot unfavorably shift in the mixture matrix.

In the case of the deformation of individual strands which already contain all elements of the V-belt, as is usually undertaken in the prior art, the reinforcing supports are specifically influenced in terms of their position within the blank and can shift from a stable cord position such that the tensile strength of the V-belt is heavily influenced. An unfavorable distribution of the load or the shear force, respectively, is created on account of cords that have shifted in such a manner in the V-belt. On account thereof, disadvantages are to be expected even in the case of only a brief overload. However, the V-belts according to the invention do not have said disadvantages because the position of the reinforcing supports cannot be modified by the production processes. The achievable performance/performance density is significantly increased by the interaction with the feature of the reinforcing support cords being radially disposed so as to be substantially in a circumferential plane in the belt back and in particular so as to be outside the V-belt substructure that engages in the belt pulley.

In order for the invention to be understood it is furthermore important to differentiate between the terms "V-belt composite" and "composite V-belt" used herein. The term "V-belt composite" in the context of this invention refers to a formation which is formed from an arbitrary number of V-belt profiles that lie beside one another and are capable of being conjointly processed. The term "V-belt composite" in this case indicates that a V-belt is not produced as an individual element but as a composite of a multiplicity of individual elements, that is to say individual V-belts (or V-belt profiles).

By contrast, a particular embodiment of a finished/completed V-belt in which a plurality of individual V-belts, or V-belt profiles, respectively, beside one another are interconnected so as to form a drive belt and are also used in the belt drive as a single transmission element/as a single drive belt is referred to as a "composite V-belt". A composite V-belt is typically composed of two or three V-belts/V-belt profiles that lie beside one another. A plurality of "composite V-belts" can thus be cut or severed from a "V-belt composite" after the latter has been completed.

The feature of the V-belt according to the invention herein being produced as a V-belt composite has likewise to be seen as a substantive feature in the above-mentioned sense and in particular in the context of one advantageous refinement which lies in that the V-belt is composed of rubber mixtures of ethylene propylene monomer (EPM) rubber, ethylene propylene diene monomer (EPDM) rubber, or hydrogenated acrylonitrile butadiene rubber (HNBR) individually or mixed, ensures that a permanent operation under a high load and in temperature ranges above 80° C. is enabled also using single V-belts or composite V-belts.

In the case of such a production by way of a V-belt composite, which is usually performed on comparatively large drums and using comparatively wide rollers, it is possible for the mentioned rubber mixtures having a comparatively low adhesion (cf. above) to be able to be successfully used. Specifically, improved handling of the comparatively large or wide formation/V-belt composite, respectively, is provided in the case of such a production by way of a composite.

One advantageous configuration of the V-belt according to the invention is created in particular when the V-belt is designed as a composite V-belt from at least two V-belts that are disposed beside one another and interconnected, wherein the woven fabric on the belt back and/or on the profile side is configured as a woven fabric that is continuous without any interruption across the entire width of the composite V-belt. A composite V-belt herein is composed of at least two V-belts that are disposed beside one another.

A composite V-belt having a woven fabric that is configured so as to be continuous in such a manner is particularly resistant in terms of the forces/friction forces that are transmitted by the belt pulley and by the deflection rollers. A far greater load-bearing capability is thus achieved than in the case of composite V-belts according to the prior art, in which individual core blanks are subsequently interconnected by a cover tier from a rubber mixture and a woven cover fabric, as has already been illustrated above.

A method in which a V-belt composite of a plurality of V-belts lying beside one another is produced from a composite V-belt blank, or a composite-body blank, respectively, said method comprising the method steps as disclosed in claim 4, is particularly suitable for producing the V-belt or the composite V-belt according to the invention. The composite-body blank herein is produced from two part-blanks in the form of wound cylindrical bodies, specifically from a first part-blank that is configured as a wound V-belt substructure and from a second part-blank that is configured as a wound V-belt back.

The first part-blank herein, specifically the part-blank that is configured as a wound V-belt substructure, is initially, or separately, respectively, produced from a rubber mixture and a woven fabric.

To this end, one or a plurality of tiers of non-vulcanized rubber is/are wound onto a flat construction drum until a rubber layer having a thickness that is predetermined for the V-belt substructure has been applied to the construction drum. Thereafter, one or a plurality of tiers of woven fabric is/are wound onto the rubber layer.

The layered composite of the rubber layer and the woven fabric tiers thus created on the construction drum is then shaped into a plurality of V-belt profiles that lie beside one another by way of a forming roller that is configured or profiled, respectively, so as to be complementary to the V-belt profile, a so-called "counter-roller". Since there are no reinforcing support cords present in this first part-blank, said reinforcing support cords can also not be unfavorably shifted within the rubber matrix in the forming of the V-belt profile. The reinforcing support cords are specifically located in the second part-blank which is produced in separate production steps.

To this end, the second part-blank that is configured as a wound V-belt back is separately produced from a rubber mixture, from a reinforcing support cord, and from a woven backing fabric.

One or a plurality of non-vulcanized tiers of rubber is/are wound onto a flat construction drum herein, thereafter one or a plurality of tiers of reinforcing support cords is/are wound, then again one or a plurality of further non-vulcanized tiers of rubber until a rubber layer that is reinforced with reinforcing supports, having a thickness that is predetermined for the V-belt back, has been applied to the construction drum.

Finally, one or a plurality of tiers of woven backing fabric is/are wound onto the rubber layer that is provided with reinforcing supports, and the layered composite thus created that forms the second part-blank is compressed on the construction drum by way of a flat forming roller.

Both part-blanks have now been completed and have to be interconnected.

To this end, the first part-blank having been produced upside down is cut from its construction drum, turned over or inverted, respectively, and with the profile lying on the inside by way of a rubber strip that comprises the cutting region is adhesively bonded so as to form a ring. The first part-blank after this action is thus in the "running position".

The first part-blank that after turning over/inverting and connecting the ends is in the running position is then positioned about two divergible vulcanizing drums that are provided with a complementary external profile such that said first part-blank envelops both vulcanizing drums and bears on parts of the circumferences of said vulcanizing drums.

The likewise completed layered composite of the second part-blank, thus of the back composite, is now pushed over and also positioned on the first part-blank that is already positioned on the displaceable vulcanizing drums and envelops the latter. As can be seen from the above, the second part-blank has already been produced in the running position and therefore does not have to be inverted.

Thereafter the vulcanizing drums are diverged and the two part-blanks on the vulcanizing drums, while revolving under a compression belt, are conjointly vulcanized so as to form the V-belt composite.

Singularizing the V-belt composite into individual V-belts or composite V-belts, wherein said composite V-belts are composed of at least two V-belts or V-belt profiles, respectively, that are disposed beside one another, is performed after the vulcanization.

One further advantageous configuration of the method lies in that the V-belt profile, or the profiled forming roller (counter roller), respectively, in the production of the first part-blank are configured such that the spacing "e" of the centerlines of two V profiles that lie beside one another is larger than 10 mm. This enables profiles to be produced which are to be classified beyond the "heaviest" V-rib profiles PM according to ISO 9982/DIN 7867.

One further advantageous configuration of the method lies in that the non-vulcanized rubber tiers in the production of the first part-blank are wound onto the construction drum under the influence of heat. This secures a positive and bubble-free composite and facilitates the accurate positioning.

One further advantageous configuration of the method lies in that the rubber tiers are at most 1.5 mm thick. This yet again supports the advantages which are achievable by heating the rubber tiers.

The advantages mentioned are of course also derived in one further advantageous configuration of the method, in that the layered composite of the second part-blank in the production of the second part-blank is also wound onto the construction drum and/or compressed thereon under the influence of heat.

One further advantageous configuration of the method lies in that chemical sealing of the cutting edges is performed, in particular by applying isocyanate, after the singularization of the V-belt composite into individual V-belts or composite V-belts. Positive sealing of the edges in relation to the expansion of the V-belts under/in oil is achieved, for example, in particular when an EPDM mixture is used. A mechanical stabilization of the cutting face of the cords is achieved in the same manner, said cutting face indeed always being created when the finished vulcanized V-belt composite is divided into individual V-belts/composite V-belts.

Summarizing once again, the method thus lies in that a blank roll is produced from two part-rolls, wherein the belt substructure is formed and pre-shaped from a rubber mixture and a woven fabric, without the deformation also relating to the reinforcing supports. To this end, the rubber mixture, preferably from thin individual tiers, in the upside down position, is wound onto a flat drum under the influence of heat, and is externally provided with one or a plurality of tiers of woven fabric. Pre-shaping is subsequently carried out by way of a profiled counter roller, and said part-blank is then cut from the drum.

The belt back having the reinforcing support cords is constructed to the target length but in the running position, and is likewise constructed on a flat drum from the mixture, the cord, the further mixture, and the woven backing fabric, and is compressed ideally under the influence of heat by way of a smooth roller.

The substructure, now turned over to the running position, is now placed onto the vulcanizing installation that is composed of two mutually displaceable vulcanizing drums, and is closed using a rubber strip. In the next step, the back composite is pushed over the substructure. The vulcanizing drums are diverged for vulcanizing, so as to conjointly heat the substructure and the back under pressure with the drums rotating. The roll obtained is subsequently singularized into individual belts or composite belts of a desired number of part-belts.

The V-belts or composite V-belts according to the invention are particularly suitable for use in agricultural vehicles or machines. As has already been illustrated above, in such uses it is easily possible for a non-foreseeable overload of drive belts to be created now and again on account of rough terrain or of obstacles that suddenly arise. This is relatively unproblematic when the belts according to the invention are used.

Figure 2:
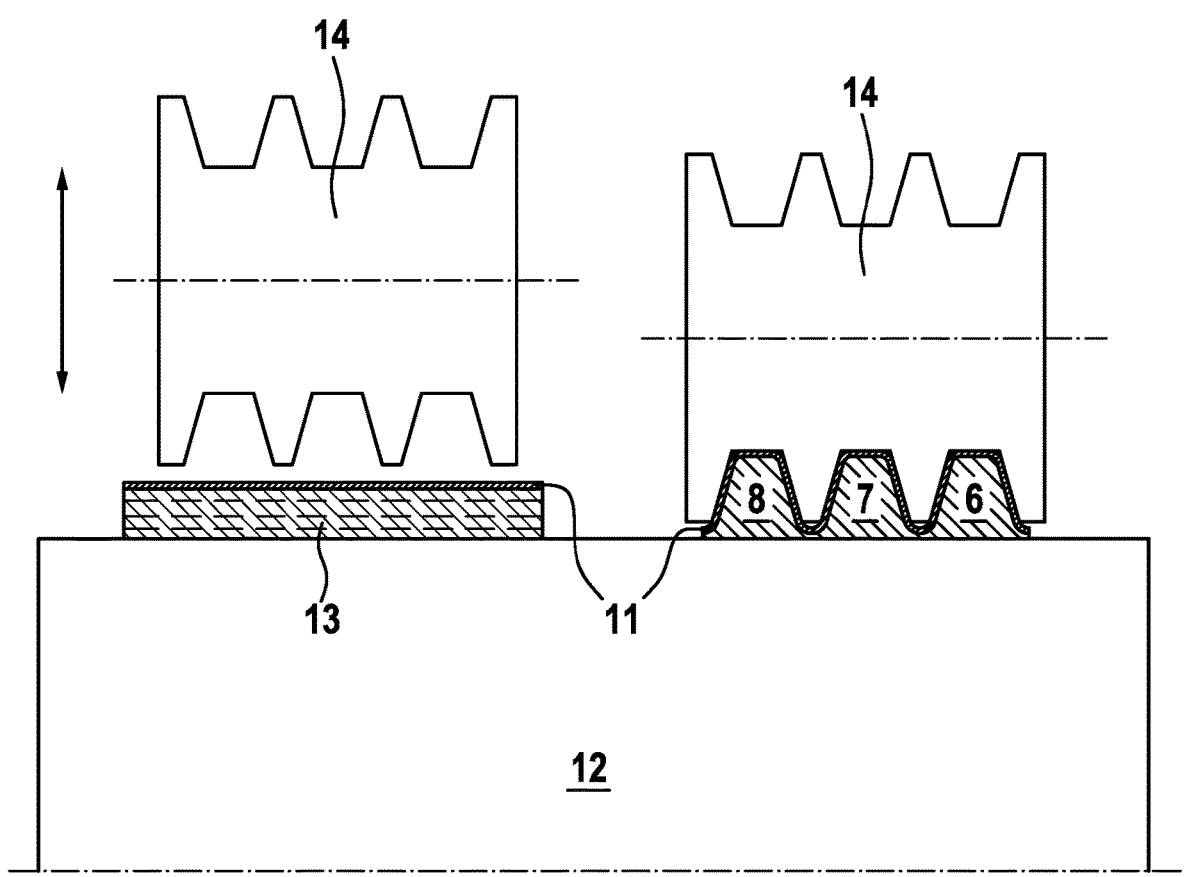
Figure 3:
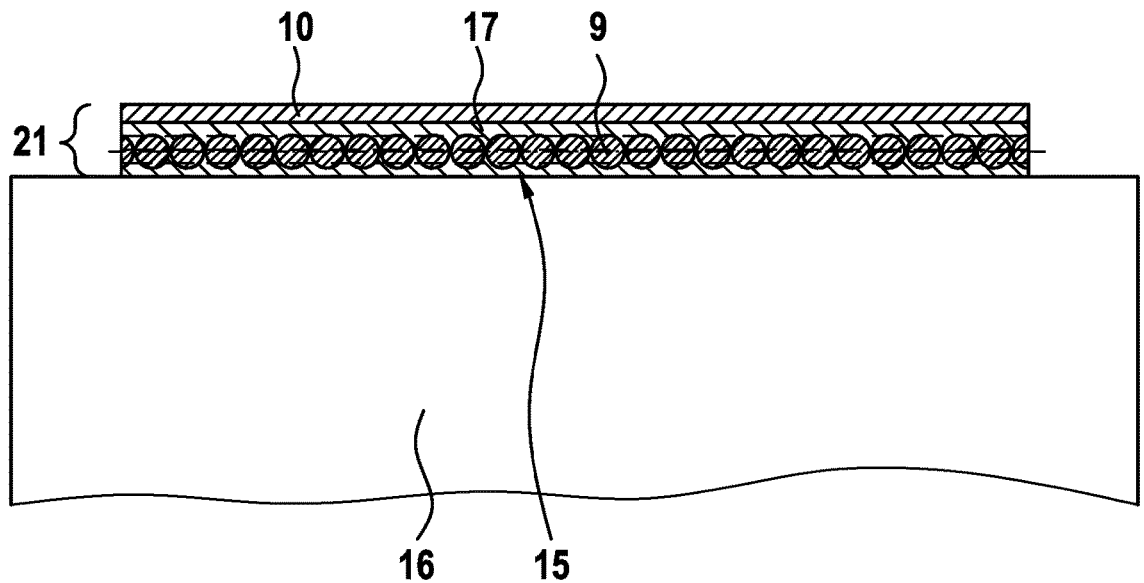
Figure 4:
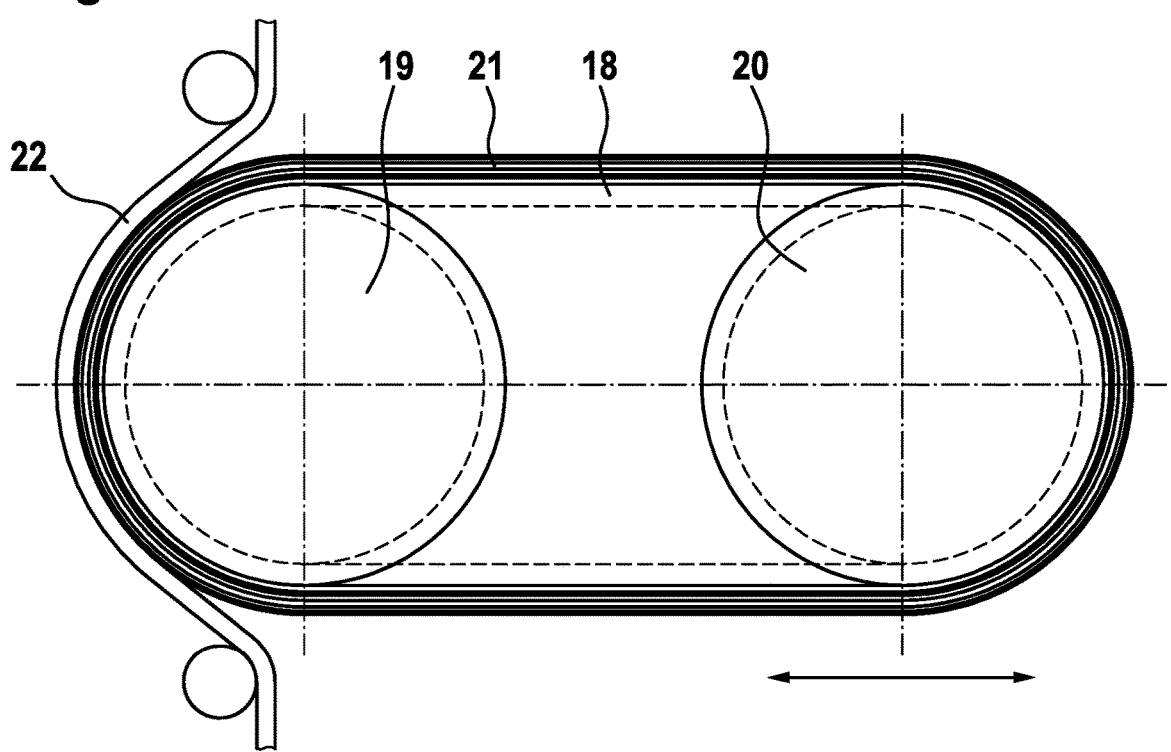

The invention is to be explained in more detail by means of an exemplary embodiment and in schematic drawings. In the figures:

FIG. 1 shows a composite V-belt according to the invention in the cross section;

FIG. 2 schematically shows the production of the first part-blank which is from a rubber mixture and a woven fabric and which forms the V-belt substructure in the finished belt;

FIG. 3 schematically shows the production of the second part-blank which is from a rubber mixture, a reinforcing support cord and a woven backing fabric, and which forms the V-belt back in the finished belt; and FIG. 4 schematically shows the further progression of the production method for further processing and vulcanizing of the two blanks.

FIG. 1 shows a composite V-belt 1 according to the invention in the cross section on a complementary belt pulley 5. The V-belt 1 is composed of a V-belt substructure 2 and a V-belt back 3.

Both parts are indicated by the dot-dashed separation line 4 in FIG. 1. The two interconnected and in each case annular parts, i.e. the V-belt substructure and the V-belt back, mutually abut at said separation line. In reality, a separation line is of course no longer present or to be seen here in the finished state shown, since both annular parts have been completely interconnected by the vulcanization. However, by the position of the reinforcing support cords in exactly the same plane in the back structure outside the engagement of the disk it can be seen that two parts were present.

The composite V-belt 1 here is composed of three V-belt profiles 6, 7, and 8 that are disposed beside one another and connected to one another. The spacing "e" of the centerlines of two V-belt profiles that lie beside one another here is 12 mm.

The composite V-belt has a tier of reinforcing support cords 9 which are radially disposed so as to be in a circumferential plane in the belt back 3 and so as to be outside the V-belt substructure 2. In the absence of unfavorable impediments on account of any previous deformation in the production, the reinforcing supports in the mixture matrix are all located in a radial plane, thus "as if wound", and do not have any mutual radial displacement whatsoever.

The composite V-belt on the belt back thereof and on the profile side thereof has in each case one woven fabric 10, 11.

The composite V-belt illustrated in FIG. 1 is moreover not be confused with a V-ribbed belt which at a first glance does look similar but in terms of the load-bearing capacity, the loading, the dimensions, the ruggedness, and the field of application thereof belongs to an entirely different category of drive belts which is also not comparable from the point of view of production.

FIGS. 2, 3, and 4 by means of only schematic drawings, when viewed together, show the production method according to the invention.

FIG. 2 herein shows the production of the first part-blank from a rubber mixture and a woven fabric, said first part-blank forming the V-belt substructure 2 in the finished belt.

Herein one or a plurality of tiers of non-vulcanized rubber is/are wound onto a flat construction drum 12 until a rubber layer 13 having a thickness that is predetermined for the V-belt substructure has been applied to the construction drum. Thereafter, one or a plurality of tiers of woven fabric 11 is/are wound onto the rubber layer. The layered composite of the rubber layer 13 and the woven fabric tiers 11 thus created on the construction drum 12 is shaped into a plurality of V-belt profiles 6, 7, and 8 that lie beside one another by way of a forming roller 14 (counter roller) that is configured or profiled, respectively, so as to be complementary to the V-belt profile.

FIG. 3 herein shows the production of the second part-blank from a rubber mixture, from a reinforcing support cord, and from a woven backing fabric. Here, a plurality of non-vulcanized tiers of rubber 15 are wound onto a flat construction drum 16, thereafter one or a plurality of tiers of reinforcing support cords 9 and subsequently again one or a plurality of further non-vulcanized tiers of rubber 17 are wound thereonto. This is undertaken until a rubber layer that is reinforced with reinforcing supports, having a thickness that is predetermined for the V-belt back, has been applied to the construction drum. One or a plurality of tiers of woven backing fabric 10 is/are then wound onto the rubber layer that is provided with reinforcing supports.

The layered composite 21 of the second part-blank thus created is compressed on the construction drum by way of a flat forming roller (not illustrated in more detail here).

In a further production step, the first part-blank having been produced upside down on the construction drum 12 is cut from the construction drum 12, turned over or inverted, respectively, and with the profile lying on the inside by way of a rubber strip that comprises the cutting region is adhesively bonded so as to form a ring 18, specifically so as to form that part of the V-belt that later forms the V-belt substructure.

FIG. 4 schematically shows the further progression of the production method. The ring 18 herein is positioned about two divergible vulcanizing drums 19, 20 that are provided with a complementary external profile such that said first part-blank envelops both vulcanizing drums and bears on parts of the circumferences of said vulcanizing drums.

Thereupon the layered composite 21 of the second part-blank, i.e. the subsequent back-composite is pushed over, or is positioned on, respectively, the first part-blank that is already positioned on the displaceable vulcanizing drums and envelops the latter. As has already been illustrated above, the first part-blank has already been placed as an inverted ring 18 that has been reconnected in the running position.

Thereafter the vulcanizing drums 19 and 20 are diverged and the two part-blanks lying on top of one another on the vulcanizing drums, while revolving under a compression belt 22, are conjointly vulcanized so as to form the V-belt composite.

Singularizing the V-belt composite into individual V-belts or composite V-belts is performed after the vulcanization, that is to say that individual rings are cut from the V-belt composite.

LIST OF REFERENCE SIGNS

Part of the Description

1 Composite V-belt
2 V-belt substructure
3 V-belt back
5 Theoretical separation line between the V-belt substructure and the V-belt back
5 Belt pulley
6 V-belt profile
7 V-belt profile
8 V-belt profile
9 Reinforcing support cords
10 Woven fabric (woven backing fabric)
11 Woven fabric (woven profile fabric)
12 Construction drum for the V-belt substructure
13 Rubber layer
14 Forming roller/Counter roller
15 Rubber tiers
16 Construction drum for the V-belt back
17 Rubber tiers
18 Inverted ring (inverted first blank/V-belt substructure)
19 Vulcanizing roller
20 Vulcanizing roller
21 Layered composite (V-belt back/second blank)
22 Compression belt

The invention claimed is:

1. A method for producing a V-belt or a composite V-belt composed of two annular interconnected parts which comprise a V-belt substructure and a V-belt back, wherein the V-belt is produced as a V-belt composite from two individually tailored and conjointly vulcanized part-blanks which comprise a first part-blank that is configured as a wound V-belt substructure and includes a belt profile, and a second non-profiled part-blank that is configured as a wound V-belt back, wherein the V-belt has one or a plurality of tiers of reinforcing support cords and on the belt back and/or on the profile side the V-belt has a woven fabric, wherein the reinforcing support cords are radially disposed so as to be substantially in a circumferential plane in the V-belt back and so as to be outside the V-belt substructure, wherein after vulcanizing the first part-blank is provided for engaging in a belt pulley, and wherein the V-belt comprises an elastomeric material; wherein a V-belt composite of a plurality of V-belts lying beside one another is produced from a composite-body blank, wherein the composite-body blank is produced from two part-blanks in the form of wound cylindrical bodies comprising a first part-blank that is configured as a wound V-belt substructure and from a second part-blank that is configured as a wound V-belt back, wherein the following method steps are provided:

a) producing the first part-blank that is configured as a wound V-belt substructure from a rubber mixture and a woven fabric, wherein: one or a plurality of tiers of non-vulcanized rubber are wound onto a flat construction drum until a rubber layer having a thickness that is predetermined for the V-belt substructure has been applied to the construction drum; one or a plurality of tiers of woven fabric are wound onto the rubber layer; a layered composite of the rubber layer and the woven fabric tiers thus created on the construction drum is shaped into a plurality of V-belt profiles that lie beside one another by way of a forming roller that is configured or profiled, respectively, so as to be complementary to the V-belt profile;

b) producing the second part-blank that is configured as a wound V-belt back from a rubber mixture, from a reinforcing support cord and a woven backing fabric; wherein: one or a plurality of non-vulcanized tiers of rubber is/are wound onto a flat construction drum; one or a plurality of tiers of reinforcing support cords is/are wound; one or a plurality of further non-vulcanized tiers of rubber is/are wound until a rubber layer that is reinforced with reinforcing supports, having a thickness that is predetermined for the V-belt back, has been applied to the construction drum; one or a plurality of tiers of woven backing fabric is/are wound onto the rubber layer that is provided with reinforcing supports; a layered composite of the second part-blank thus created is compressed on the construction drum by way of a flat forming roller;

c) whereupon the first part-blank having been produced upside down: is cut from its construction drum, turned over or inverted, respectively, and with the profile lying on the inside by way of a rubber strip that comprises the cutting region is adhesively bonded so as to form a ring; and is positioned about two divergible vulcanizing drums that are provided with a complementary external profile such that said first part-blank envelops both vulcanizing drums and bears on parts of the circumferences of said vulcanizing drums;

d) the layered composite of the second part-blank is pushed over, or is positioned on, respectively, the first part-blank that already envelops the displaceable vulcanizing drums;

e) whereupon the vulcanizing drums are diverged and the two part-blanks on the vulcanizing drums, while revolving under a compression belt, are conjointly vulcanized so as to form the V-belt composite;

f) and singularizing the V-belt composite into individual V-belts or composite V-belts from at least two V-belts that are disposed beside one another is performed after the vulcanization.

2. The method as claimed in claim 1, wherein the V-belt profile, and the profiled forming roller, respectively, in the production of the first part-blank are configured such that spacing "e" of the centerlines of two V profiles that lie beside one another is larger than 10 mm.

3. The method as claimed in claim 1, wherein the non-vulcanized rubber tiers in the production of the first part-blank are wound onto the construction drum under the influence of heat.

4. The method as claimed in claim 3, wherein the rubber tiers are at most 1.5 mm thick.

5. The method as claimed in claim 1, wherein the layered composite of the second part-blank in the production of the second part-blank is wound onto the construction drum and/or compressed thereon under the influence of heat.

6. The method as claimed in claim 1, wherein chemical sealing of the cutting edges is performed, in particular by applying isocyanate, after the singularization of the V-belt composite into individual V-belts or composite V-belts.

* * * * *